Jan. 11, 1966   J. M. M. BRUSCHKE ET AL   3,228,357
APPARATUS AND METHOD FOR ENROBING CONFECTIONS
Filed Jan. 24, 1963   5 Sheets-Sheet 1

INVENTORS
JOOST M. M. BRUSCHKE
THOMAS L. JERNIGAN

United States Patent Office 3,228,357
Patented Jan. 11, 1966

3,228,357
APPARATUS AND METHOD FOR ENROBING CONFECTIONS
Joost M. M. Bruschke and Thomas L. Jernigan, Richmond, Va., assignors to Eskimo Pie Corporation, Richmond, Va., a corporation of Delaware
Filed Jan. 24, 1963, Ser. No. 253,566
17 Claims. (Cl. 107—54)

This invention relates to methods and apparatus for conveying confections and coating them with enrobing material. It has a particular application to applying a uniform and unbroken coating over the outer surfaces of frozen confections such as ice cream bars which have no stick or other permanently attached protuberance by which they may be held while being coated.

In order to coat ice cream bars, or similar confections, with chocolate or other edible enrobing material, the confection must be transported in such a manner that the enrobing material is applied evenly onto all portions of the external surfaces. If the confection has no stick or other means of being held while being immersed in the enrobing material, the conveyor which transports the confection through a spray bath or pool of coating material must not mask the exterior surfaces of the bar so that uncoated spots appear in the finished product.

A typical apparatus for applying enrobing material to frozen confections is that illustrated in U.S. Patent 2,081,888. In that apparatus the frozen confections are transported through a downwardly sprayed curtain of enrobing material by means of a conveyor which utilizes spaced apart, transverse cross rods as the article supporting medium. Although the apparatus of the aforementioned U.S. patent permits a relatively intact and smooth coating to be applied on the top and all side surfaces of the confection, the bottom surface of the confection resting on the bars of the conveyor does not receive the same quality coating. Although the confection is semi-floated through a pool of enrobing material, the cross bars of the conveyor tend to mask portions of the bottom of the confection so that the enrobing material does not evenly cover the bottom. Furthermore, the presence of the conveyor cross bars does not permit the bottom surface of the confection to be smoothed and wiped clean by means of a wiper or the application of an air blast.

Apparatus used in the processing of food products has an added problem in that its basic design must permit the highest possible standards of cleanliness to be maintained. Small features of negligible importance in other equipment become of paramount importance in food processing equipment. For example, a spray head for applying liquid chocolate to ice cream must be designed so that brushes and cleaning equipment can completely pass through the internal passages in cleaning the equipment.

Accordingly, an object of this invention is to provide an apparatus for conveying a confection whereby substantially all portions of the exterior surfaces of the confection are exposed.

Another object is to provide a method and an apparatus for applying an unbroken coating of enrobing material covering all exterior surfaces of a confection.

A still further object is to provide a method and apparatus for applying a smooth, even and unbroken coating of enrobing material over the exterior surfaces of a confection.

Yet another object is to provide an apparatus for removing excess enrobing material from all surfaces of a freshly coated confection.

Still yet another object is to provide a sanitary spray device for dispensing a curtain of edible liquid material in an enrobing apparatus.

The disadvantages discussed above relating to the prior means of applying enrobing material have been overcome and the objects listed above have been attained by utilizing apparatus shown in the attached drawings and methods described herein, in which.

Figure 1:
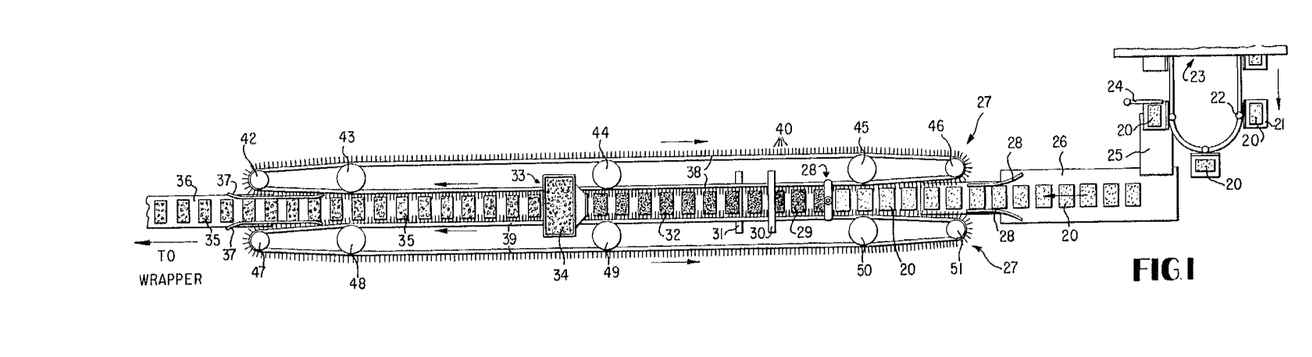
FIG. 1 is a diagrammatic top plan view of a machine for coating confections.

The overall operation of the enrobing machine is best illustrated in FIG. 1. Hard frozen confections 20, resting on plates 21 and being transported in the direction of the arrow by the conveyor 22 from the forming and freezing machine 23 (not illustrated), are individually removed from the support plates 21 by contact with the pushing device 24 which removes each confection 20, in turn, from its support plate 21 and causes it to slide down the inclined slideway 25 onto a feed belt or feed chute 26 whereby the confections 20 are fed one at a time into the inlet end of the conveyor 27 in the direction of the arrow. The confections are cooled to such a degree that they can be subjected to room temperature for a considerable period before thawing and softening.

The conveyor 27 comprises two flexible, endless belts 36 and 38 having sharpened spikes 40 and 41 projecting outwardly from each respective belt and arranged abreast each other in elongated loops so the inwardly projecting spikes of opposing adjacent loops project towards each other with the separation between the ends forming a conveying path. The major portion of those portions of the belts which lie abreast are parallel and separated a distance to space apart the opposing spike ends in opposite rows by less than the width of a confection. A portion of the facing belts at each end of the loops are angled back from the parallel sections at a small acute angle so the opposing spike ends in the terminal portions at the ends of the conveying path gradually diverge to a spacing greater than the width of a confection to form entrance and exit alleys of the conveying path.

The endless belts are moved circumferentially around the pulleys which support them at the same velocity so the spikes of opposing rows move together at the same velocity. The confections 20 are guided into the centerline of the spike conveyor 27 by the converging entrance centering rails 28 so that the sides of the confections are impaled by the inner, opposing rows of spikes of the conveyor 27 which are moving from right to left in the direction of arrows in FIG. 1. The impaled confections 20 are carried along the conveying path down the longitudinal axis of the enrobing machine past the chocolate sprayer 28, which sprays a curtain of chocolate onto the confections simultaneously from the top, bottom and all sides as subsequently described. These freshly coated, impaled confections 29 are carried past air blast nozzles 30 and 31 which direct narrow sharp edged curtain-like blasts of air transversely across all surfaces of the moving freshly coated confections 29 to remove the excess liquid chocolate and smooth all surfaces of the coated confections to produce a uniform thickness which is hardened by the low temperature of the frozen confection to form a smooth coating on all surfaces of the confection. The blasted and smoothed confections 32, still impaled on the conveyor, may travel beneath a crumb dispenser 33 positioned above the conveyor beyond the air blast nozzles so that crumbs 34 are applied atop the coated confections 32 to form the chocolate coated, crumb encrusted final form of the confections 35. At the discharge end of the spike conveyor the encrusted confections 35, maintained in the centerline of the machine between the parallel exit rails 37, are removed from the diverging spikes and carried away on the moving conveyor belt 36 underlying the exit end of the spike conveyor. The conveyor belt 36 transports the confections 35 to a wrapping machine or disposes of them in some other manner. Due to the very shallow angles at which the spikes in the entrance and exit alleys converge and diverge in the locations where the confections become impaled on and disengaged from the spikes, the spikes move substantially axially in their length relative to the confections so that shallow holes of minute diameter are made in the side of the confection by the puncturing action of the spikes. These tiny holes are so small as to be essentially unnoticeable.

*Spike conveyor*

Figure 3:
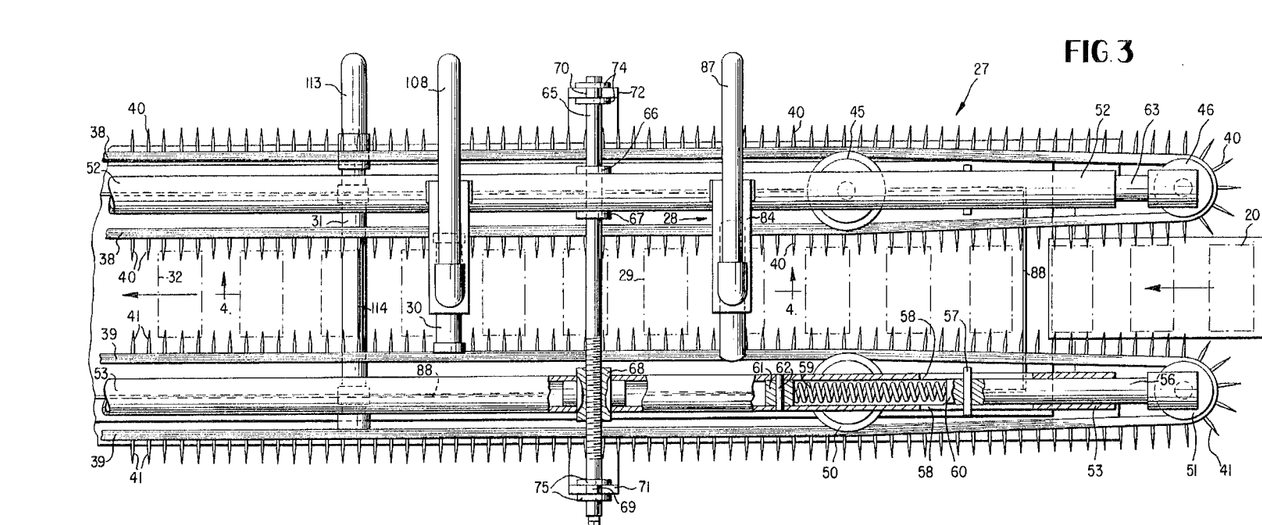
FIG. 3 is a top plan view of the feeding end of the machine of FIG. 1 in which the conveyor shields have been omitted to expose the conveyor.
Figures 7, 8, 9:
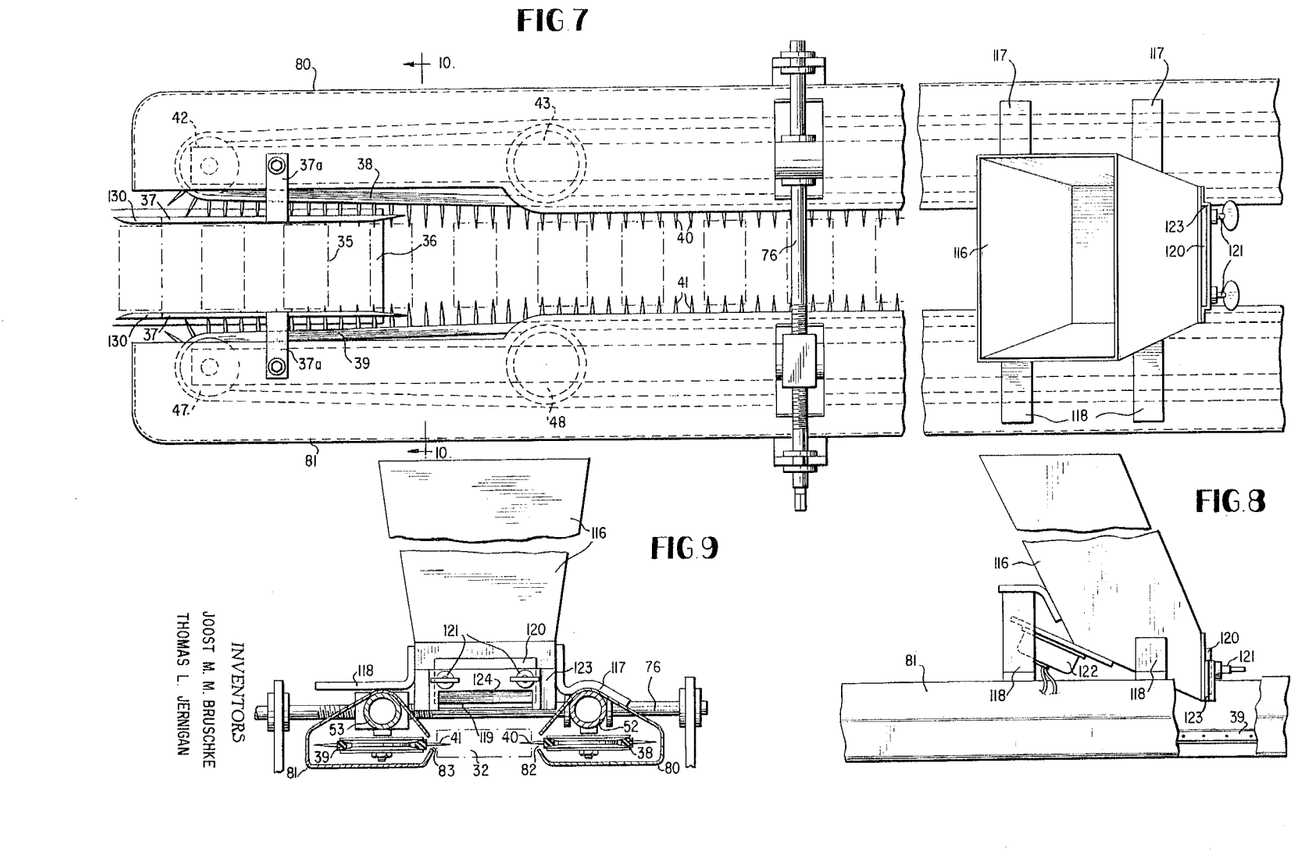
FIG. 7 is a fragmentary top plan view of discharge end of the machine of FIG. 1.
FIG. 8 is a side elevation view of the crumb dispenser.
FIG. 9 is an end view of the crumb dispenser.

As best illustrated by FIGS. 1, 3 and 7, the conveying elements which carry the confections through the enrobing process comprise two flexible endless belts 38 and 39 from the sides of which a train of thin spikes 40 and 41, respectively, protrude perpendicularly outwardly around the periphery of the belt. The thin spikes have sharpened outer ends, are spaced apart a distance which is considerably less than the length of a confection in the conveying direction so that several spikes support the confection from each side and project substantially equidistantly from the belts. One belt 38 is arranged in the form of a narrowly elongated horizontal loop supported around the pulleys 42, 43, 44, 45 and 46 with the spikes 40 projecting outwardly from the loop approximately the same distance (see FIG. 1). The other belt 39 is similarly arranged around the pulleys 47, 48, 49, 50 and 51 in an identical loop which is spaced from and alongside the loop of belt 38 so that the sharpened ends of the spikes on the adjacent, inner portions of both loops project toward each other.

Figure 2:
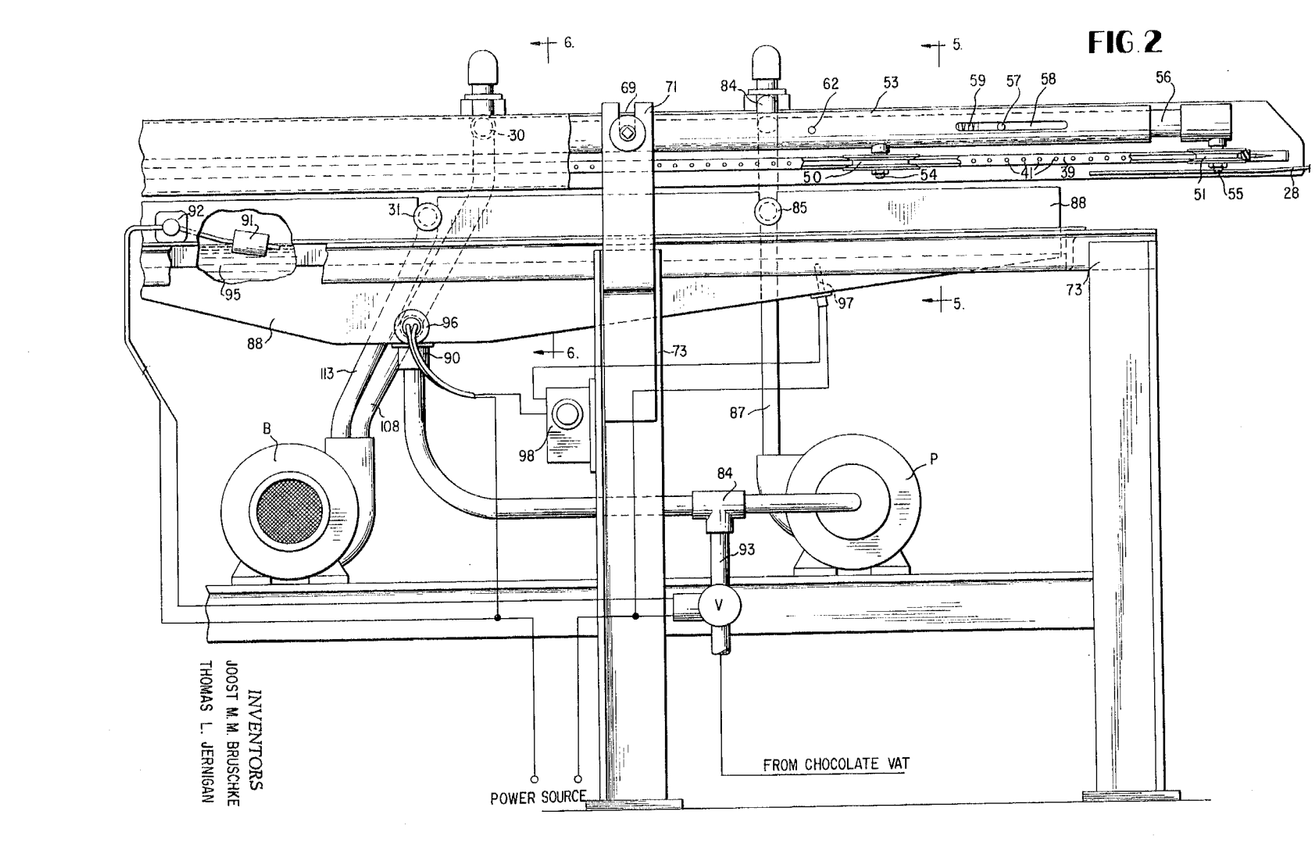
FIG. 2 is a side elevation view of the feeding end of the machine illustrated in FIG. 1 with the conveyor protective shields partially broken away to show the belt, pulleys and belt tensioning device of the conveyor.

The pulleys 48, 49 and 50, supporting the central portion of the belt 39 and the exit end pulley 47, are rotatably supported by axles spaced along a longitudinal support tube 53, the axles projecting downwardly from the support tube in the manner illustrated in FIG. 2. In this view the top end of the vertically disposed axle 54 is affixed to the bottom of the support tube 53 and the pulley 50 is rotatably mounted at the lower end of the axle 54. Similar pulleys 42, 43, 44 and 45, carrying the other belt 39, are supported by the same arrangement of axles which extend downwardly from another supporting tube 52 spaced parallel to and abreast the first support tube 53.

The diameter of each of the three central belt pulleys 43, 44, 45 and 48, 49, 50, which support the middle loop portion of both belts, are the same so that the central portions of the flanking loops are parallel. The end pulleys 42, 46 and 47, 51 for each belt loop are slightly smaller in diameter than the middle pulleys so that the end portions of each loop converge gradually along a straight line between the end pulley and the next pulley.

Provisions for tensioning the belt 39 are provided by supporting the end pulley 51 at the entrance end of the conveyor 27 on a vertical axle 55 extending downwardly from the outer end of an extension rod 56 which slideably fits within an end portion of the support tube 53, in the manner illustrated in FIG. 3. A pin 57, transversely piercing the support rod 56 near its inner end lying inside the tube 53, projects outwardly through horizontal, longitudinal slots 58 in the wall on opposite sides of the support tube 53 to retain the rod 56 within the support tube. A spring 59, contained concentrically within the support tube 53 beyond the inner end of the rod 56, has one end in contact with the inner face 60 of the support rod 56 and the other end in contact with the block 61 which is affixed to the tube 53 by the transverse pin 62. The entrance end pulley 46 of the other belt 38 is similarly attached beneath a sliding support rod 63 which is resiliently disposed within the end of the other support tube 52 in the same manner so as to provide a means of tensioning the belt 38.

The two longitudinal support tubes 52 and 53, each carrying a spike lined endless belt mounted on the support pulleys to form an elongated loop, are mounted in a parallel, side by side relationship spaced apart a distance such that the sharpened ends of the opposing spikes on the inwardly facing sides of the belts along the parallel central portion of the two loops are separated by less than the width of a confection. The separation of the support tubes and the convergence of the end portions of both loops, due to smaller diameter of the end pulleys, is such that the spacing between the sharpened ends of the opposing spikes of the two belts at the extreme ends of the respective loops is greater than the width of the confection. Thus, as can be readily seen from FIG. 3, when a confection 20 moves into the entrance area of the spike conveyor at the extreme righthand side of the converging motion of the spikes 40 and 41, due to the gradually increasing widths of the opposite loops, causes the sharpened ends of the spikes to penetrate axially of the length of the spike into the sides of the confection as it moves toward the center portion of the conveyor in the direction of the arrow so that the confection 20 is impaled from both sides by the horizontal spikes. When the confection reaches a position abreast of the first center pulleys 45 and 50, the confection is impaled from both sides and fully supported by several adjacent spikes of both conveyor belts 38 and 39. The feed belt or feed chute 26 terminates a short distance within the entrance area of the spike conveyor at a point where the opposing spikes on the inside of the two belts 38 and 39 are brought sufficiently close together to penetrate the confection from both sides so the confection is fully supported by the spikes as it is conveyed along the axis of the machine between the two moving belts. The angle formed between (a) the terminal length at each end of the loop from the end pulley and the next to end pulley and (b) the middle portion of the belt is a very small acute angle so that there is a negligible change in alignment of the spikes as they pass from the terminal portions at the end of the loops to the parallel middle portions of the loop of the pulleys 43, 45, 48 and 50. Therefore, the lateral motion of the spikes in the terminal portions is essentially at right angles along the axis of the spike to the direction of movement of the belt.

The pulley belt support tubes 52 and 53 are supported at several points along their length by rotatable cross support shafts similar to the cross shaft 65 of FIG. 3, which shaft projects transversely through both pulley belt support tubes. The cross support shaft 65 being freely rotatable about its longitudinal axis with respect to the support tube 52, has two spaced collars 66 and 67 affixed to one end which bear against opposite sides of the support tube 52 to prevent transverse motion of the cross shaft 65 relative to the support tube 52.

The other end of the cross shaft 65 is threaded and passes through an internally threaded hole in the connector 68 which is affixed to and transversely pierces the other pulley belt support tube 53. The outer ends of the cross shaft 65 rest in vertical slots 69 and 70 in the top of vertical stanchions 71 and 72 on opposite sides of the machine, the stanchions connecting to the base frame 73 of the machine. A pair of collars 74 and 75 affixed to both ends of the cross shaft 65 straddle the stanchions 71 and 72 and restrain any longitudinal motion of the cross shaft. A square head 76 at one end of the cross rod 65 provides a grip for a wrench with which to rotate the cross shaft so the threaded connector 68 moves the belt support rod 53 towards or away from the other cross rod 52 and changes the spacing between the inwardly projecting spikes of the two belts 38 and 39. Similar cross support shafts spaced along the length of the conveyor provide support for the support rods 52 and 63 along their length, e.g., the cross support shaft 76 of FIGS. 6 and 7. By rotating the cross support shafts 65 and 76, the spacing between the parallel support tubes is changed and the spacing between the inwardly projecting spikes of the opposite belts adjusted to accommodate confections of different widths.

Figure 10:
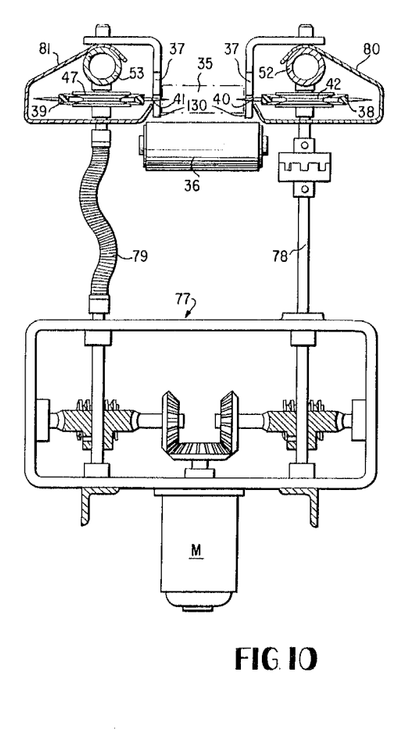
FIG. 10 is a transverse section across the discharge end of the machine facing the conveyor driving mechanism.

End pulleys 42 and 47 for each belt 38 and 39 at the exit end of the conveyor are each connected to a drive system as illustrated in FIG. 10. A motor M, through suitable gearing in gear box 77, drives two vertical shafts 78 and 79 which connect, respectively, to the two exit end pulleys 42 and 47, one of the shafts 79 being flexible to accommodate the lateral adjustment of the one support rod 53. The pulleys 42 and 47 are rotated in opposite directions by the gearing within the box 77 so that the pulley 47, as viewed in FIG. 1, rotates counterclockwise and the pulley 42 clockwise at the same speed causing the two belts 38 and 39 to move in a direction of the arrows. The tensioning mechanism of the end pulleys 46 and 51 at the entrance end to the conveyor maintains the belts in tension so they will be driven by the powered end pulleys 42 and 47. Provisions for varying the driving speed of the belts may be provided by utilizing a variable speed motor or by other well-known arrangements. The speed of the drive is adjusted so that the chocolate on the outside of the confection becomes congealed by the low temperature of the frozen confection by the time the confection reaches the exit end of the conveyor.

The width between the inner, opposing rows of spikes gradually increases from the last center section pulleys 43 and 48 at the lower end of the conveyor to the exit end where the direction of the belts is reversed around the smaller diameter exit end pulleys 42 and 47. A pair of parallel exit rails 37, each supported near the lower ends of the belt pulley support rails 52 and 53 by brackets 37a, protrude into the diverging exit area of the opposing spikes and are separated by slightly more than the width of the confections. As the separation between opposing spikes increases in the exit area, an impaled confection moving into the exit alley of the conveyor path will be guided along the centerline between the opposing spikes by the exit rails 37 which counteract the sidewise pull of the spikes as they are gradually withdrawn from the confections due to the divergence of the belts 38 and 39 at the lower terminal end of the two loops. The angle of divergence of the belts at the exit end is small, as at the entrance end, with the withdrawal motion of the spikes relative to the confection being essentially along the length of the spike so the confection has only scarcely visible tiny punctures along both sides after the spikes are entirely withdrawn. A conveyor belt or inclined slide 36 underlies the exit end of the conveyor to provide support for the confections as the spikes are withdrawn.

Each of the belt and pulley assemblies are enclosed within shields 80 and 81 which substantially encompass the respective conveyor assemblies except for the horizontal slots 82 and 83 through which the inwardly spacing rows of spikes 40 and 41 protrude (see FIGS. 7 and 9). The shields are affixed to the support rods 52 and 53 by suitable brackets. The belts 38 and 39 are made of nylon or other flexible plastic material which will not be affected by chocolate or other edible coating material and can be maintained in a sanitary condition. The spikes 40 and 41 are of stainless steel or other non-corrosive material which can be maintained in a sanitary condition.

*Chocolate sprayers*

Figure 4:
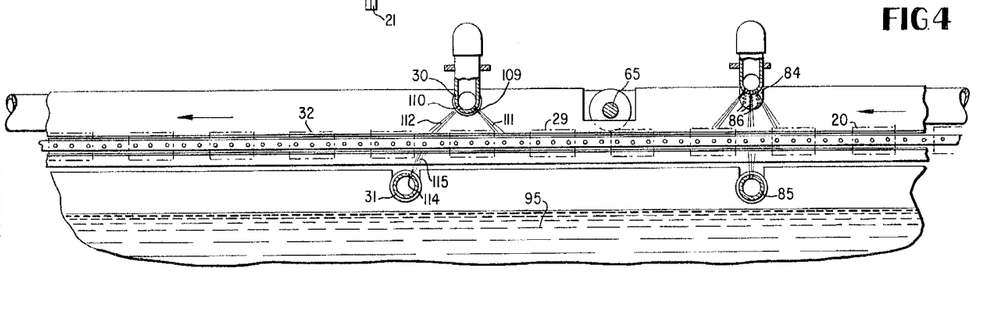
FIG. 4 is a fragmentary, longitudinal section showing the relative location of the enrobing sprayers and air blast tubes.
Figure 5:
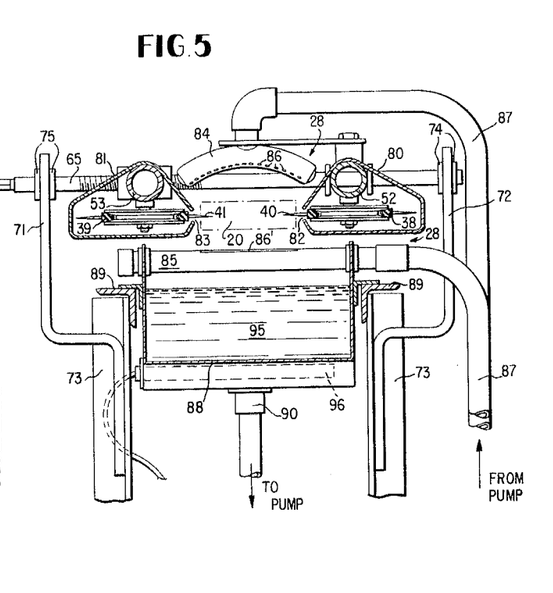
FIGS. 5 and 6 are transverse sections taken along lines 5—5 and 6—6 of FIG. 2.

Sprayers 28, comprising an upper spray tube 84 and lower spray tube 85, as best seen in FIGS. 2, 4 and 5, are positioned transverse to above and below the inwardly facing rows of spikes at a point beyond the entrance end of the conveyor. These spray tubes provide an upwardly and downwardly directed vertical curtain of chocolate which impinges on all exterior surfaces of each impaled confection as it is carried past the point by the moving belts 38 and 39. The top spray tube 84 is a hollow, arcuate shaped tube having a plurality of rows of spray holes 86 extending lengthwise of the tube along its lower, concave surface. The arc of the tube is of such a radius that chocolate sprayed from the spray holes 86 at the end portions of the tube is directed inwardly from the vertical to strike the sides of the confection at an angle. A longitudinal row of spray holes is located on each side of the center on the underside of the top spray tube 84 so that chocolate is sprayed forwardly and rearwardly of the vertical along the tube axis as seen in FIG. 4 so that chocolate strikes the front and rear faces of the confection at an angle as it passes by. The lower spray tube 85 is a hollow tube, closed at one end and connecting at the other end to a supply line 87, with a slot 86' extending lengthwise along the top surface of the tube at its midline so as to spray an upwardly directed curtain of chocolate which impinges on the bottom side of each confection as it passes over the tube. The spray tubes 84 and 85 are connected to the pressure side of pump P through suitable pipe connections to supply line 87.

An open top drip pan 88 is supported from the machine frame 73 by support angles 89, as indicated in FIG. 5, to lie below the belts 38 and 39 beneath the line of confections impaled on the spikes. The drip pan 88 extends longitudinally of the conveyor below both belts to extend toward the conveyor entrance beyond the spray assembly 28 and toward the conveyor exit beyond the lower air blast tube 31 so as to catch the excess chocolate from the sprayers which does not adhere to the confections and the drippings from the freshly sprayed confections as they are carried by the conveyor past the two air blast tubes 30 and 31. (See FIGS. 2 and 6.) A discharge line 90 extends from the bottom of the drip pan 88 to the suction side of the pump P so that the chocolate 95 contained in the drip pan 88 is recirculated through the spray system. A float 91, mounted within the drip pan and responsive to the level of fluid within the pan, controls float switch 92 which connects to the opening and closing mechanism for valve V in the supply line 93 which joins the discharge line 90 at a T connection 94 on the suction side of the pump P. When the level of chocolate 95 within the drip pan 88 falls below an established level, the movement of the float 91 closes the electrical switch 92 and power is supplied to the operating mechanism of valve V to open the valve and connect the suction side of the pump P to the chocolate supply vat for replenishing the supply, the float 91 breaking the power connection to valve V and closing the valve when the chocolate level in the drip pan 88 reaches the desired operating level.

An electrical emersion heater 96 within the drip pan 88 heats the chocolate 95 in the pan 88 and maintains the chocolate at an optimum temperature for spraying onto the confections. A thermostat in probe 97, extending upwardly into the chocolate 95 from the bottom of the drip pan 88, is connected in series with a control 98 to regulate the power supplied to the emersion heater 96 and maintains the chocolate 95 at a constant temperature.

Figure 11:
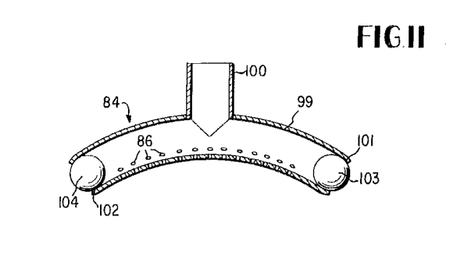
FIG. 11 is a transverse section of the top sprayer.

The construction of the top spray tube 84 is shown in detail in FIG. 11. The spray tube comprises a hollow tube 99 open at both ends and bent into the form of an arc. An opening at the top central portion of the arcuate tube 99 leads to a straight tubular section joining the arcuate tube perpendicular to its longitudinal axis. The inside diameter of the vertical tube 100 is at least as great as that of the arcuate section 99 of the tube. The ends 101 and 102 of the arcuate tube 99 are crimped inwardly so that the inside diameter at the ends of the arcuate tube is slightly less than that of the remainder of the tube, and forms a constriction at either end. The crimped constriction has an annular, concave shape which conforms to the contacting outer contour of balls 103 and 104, which loosely fit within the tube, and form a tightly fitting seat in which the balls may rest at the ends of the tube. Spherical balls 103 and 104 have a diameter less than the nominal inside diameter of the tubes 99 and 100 but greater than the diameter of the crimped ends 101 and 102 and tightly seat into the annular, concave seats at the two ends of the arcuate tube 99 to seal the open ends of the tube. The balls 103 and 104 are maintained in tight contact against the annular seat formed by the crimped ends of the tube by the pressure of the chocolate from the pump P, thereby closing the tube ends when the sprayer is in operation. The purpose of this construction is to permit a thorough cleaning of the top sprayer. On removal from the pump connections 87, the balls 103 and 104 may be removed from the top spray assembly through the top connecting passage 100 so that the interior of the tube may be cleaned by the insertion of brushes when the balls removed from the tube, the interior passages being open on both ends so as to have no dead ends. Since high standards of cleanliness must be maintatined, all sections of the apparatus holding the chocolate must be capable of complete disassembly for periodic cleaning. It is quite important that all lines, fittings, etc. in which edible material is conveyed, be designed so that cleaning brushes are readily insertable into the lines and that there are no pockets or dead ends which will hold the chocolate and prevent its ready removal by direct contact with cleaning brushes.

Figure 12:
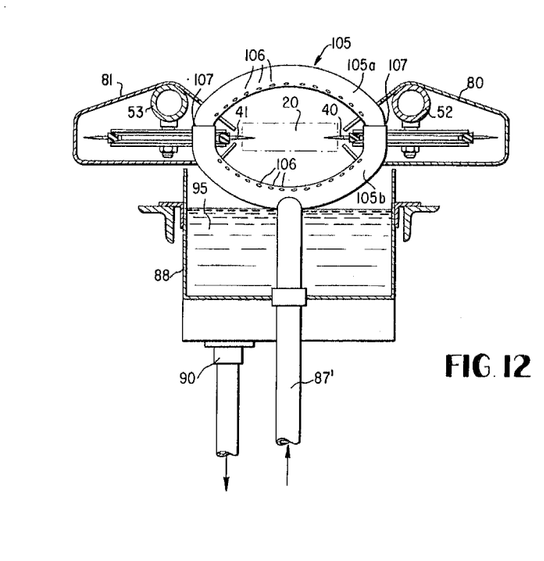
FIG. 12 is a view similar to FIG. 5 showing an alternate embodiment of a sprayer.

FIG. 12 is an illustration of the possible alternate embodiment of the top and bottom spray assembly illustrated in FIG. 5. In lieu of the separate upper and lower spray tubes 84 and 85 of FIG. 5, FIG. 12 shows a closed elliptical spray tube 105 having spray holes 106 which extend along the upper and lower surfaces on the inner circumference of the tube to spray the chocolate towards the center of the ellipse as an inwardly directed fan-like curtain which impinges onto the confection from all sectors as it is carried through the tube. The closed spray head 105 is connected to the discharge side of the pump P by the pipe connection 87'. The spray head 105 would probably be made of two sections 105a and 105b which are joined at the joints 107 so that the upper and lower sections 105a and 105b may be disassembled for cleaning.

Drip removal

Figure 6:
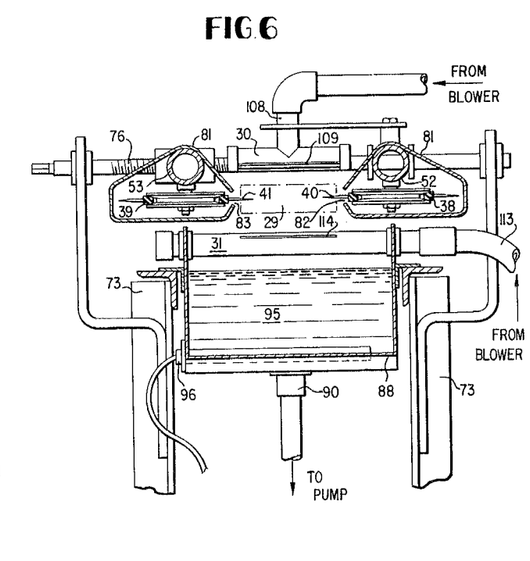

Air blast tubes 30 and 31, extending transversely across the conveying path formed by the central opposing rows of spikes in the conveyor 27, are positioned above and below the path of the conveyed confections at a point on the conveyor line beyond the sprayers 28. Thin, curtain-like blasts of air from these tubes move progressively across all exterior surfaces of the freshly coated confections 29 from front to rear as they move down the conveyor line so that excess chocolate is wiped from the confection and the chocolate is smoothed into an evenly applied coating. The arrangement of the air blast tubes is best illustrated in FIGS. 2, 4 and 6. An upper hollow tube 30, closed at both ends, extends across the conveyor line between the two belts above the line of impaled confections. An air supply line 108 connecting to the mid point of the upper blast tube 30 leads to the pressure side of the blower B. The tube has two, thin, longitudinal slots 109 and 110 each extending along the lower surface of the tube with the line of the slots about 45° upwardly on each side of the vertical. Air pressure to the blast tube 30 causes thin, sheet-like curtains of air 111 and 112 to be directed downwardly from the upper blast tube 30 in planes which extend longitudinally of the tube and are tilted approximately 45° from the vertical as illustrated in FIG. 4. A lower blast tube 31, which is hollow and extends transversely across the center path of the spike conveyor is positioned below the line of impaled confections and has a connecting line 113 leading to the pressure side of the blower B. The top forward surface of the tube 31 has a longitudinal slot 114 with the line of the slot lying approximately 30° below the vertical in the direction of the conveyor entrance. Air pressure supplied to the blast tube causes a sheet-like blast of air 115 to be directed forwardly and upwardly against the lower surfaces of the confections 29 as indicated in FIGS. 4 and 6. The lower blast tube 31 is spaced from the vertical plane of the upper tube towards the exit end of the conveyor a distance such that each freshly coated confection 29 carried down the conveyor line has its forward face and top surface wiped by the downwardly and forwardly directed blast 111 of the upper tube 30, the lower surface wiped by the upwardly directed blast 115 from the lower tube 31, and then the rear face wiped by the downwardly and rearwardly directed blast of air 112 from the top tube 30. The excess chocolate which is wiped from the confections 29 by the blasts of air falls into the drip pan 88 which underlies the blast tube. As each confection passes through the three air blasts, the movement of the sharp edged blasts over each of the external surfaces produces a coated confection 32 whose surfaces have a substantially uniformly thick layer of chocolate in a smoothly applied coating which is unbroken except in the tiny puncture holes on the sides of the confection due to the penetration of the conveying spikes 40 and 41. The spike holes are so small as to be essentially invisible for all practical purposes. However, if desired these tiny punctures in the chocolate coating may be smoothed over by contact with a heating iron 130 which may contact the two sides of the confections as they are carried away from the exit end of the spike conveyor after being disengaged from the conveying spikes. Such a smoothing iron 130 could be integrated into the exit guide rails 37 by heating a portion of these rails, or attaching a small heated projection to the inner sides of the exit rails 37 so as to wipe the sides of the confections as they are being transported away from the coating machine by the belt conveyor 36.

Crumb applicator

A crumb dispenser 33 is mounted to the machine frame 73 and supported above the line of conveyance of the smoothly coated confections 32 after they pass the air blast nozzles 30 and 31 to deposit a layer of edible crumbs 34 atop the confections thereby producing the final article 35 which is a chocolate coated ice cream bar with one surface covered with edible matter such as ground nuts, candy or the like. The crumb dispenser has an open top bin 116 into which the crumbs 34 are loaded. The bin 116 is mounted to the frame work 73 of the machine as illustrated in FIGS. 7 and 9 by the straps 117 and 118 connecting either side of the bin to the support rods 52 and 53. The straps 117 at the forward and rear sides of the bin on one side are affixed to the support rod 52, the straps 118 on the other side of the bin rest on the support rod 53 to permit relative movement between the bin and the support rod 53 when it is adjusted laterally to vary the spacing between the two spiked conveyor belts, as may be seen in FIG. 9. The forward lower section of the bin has a rectangular hole 119 which extends across the width of the bin transverse to and over the path of the spiked conveyor through which crumbs from the bin 116 will fall onto the confections 32 as they pass beneath the dispenser. A retaining flange 123 overlies the first face of the bin 116 in the area of the hole 119 and is spaced away from the front bin face by the thickness of a movable plate 120 which is slideably retained between the face of the bin and the retaining flange which contacts the bin at the side and bottom edges to form a vertical slot in which the plate 123 is held. The retaining flange has an opening 124 which overlies the hole 119 in the bin. Two clamps 121 extending through the first portion of the retainer plate 123 contact the plate 120 and hold it in any predetermined vertical position. The size of the opening 119–124 in front of the bin 116 may thus be varied by adjusting the position of the plate 120 upwardly or downwardly so that the volume of crumbs dispensed from the bin 116 can be controlled. A powered vibrator 122 is rigidly mounted to the bottom of the bin 116. Vibration from the vibrator 122 transmitted to the bin 116 causes crumbs from the bin to fall through the variable size opening 119–124 and onto the impaled and coated confections 32 as they pass beneath the crumb dispenser. The vibrator 122 may be operated at all times so that the crumbs are continuously shaken from the bin 116, excess crumbs not deposited on the confections being collected below the dispensing unit. Since the confection conveyer has no flat moving surface on which the crumbs would fall, and accumulate, the excess crumbs are not carried into other portions of the machinery to contaminate these areas with crumbs. However, if desired, the vibrator may be operated discontinuously or a gate, which is operable to completely close the lower exit from the bin 116, may be intermittently opened and closed in a controlled timed relationship so that crumbs are dropped from the dispenser only when a coated bar is directly beneath the dispenser. It should be noted that the dispenser must be located at such a distance from the spray nozzles 28 that the chocolate on the surface of the confections has not become hardened whereby the crumbs will become bonded to the chocolate when it does harden due to frozen condition of the confection. The speed of the conveyer must be adjusted so the chocolate on the freshly coated confections does not harden before the confection passes beneath the air blast tubes 30 and 31 and the crumb dispenser 33, but the chocolate does harden by the time the confection is released at the exit end of the spike conveyer.

While the above matter describes and illustrates preferred embodiments and methods of the invention, it should be understood that the invention is not restricted solely to the described embodiments and methods but that it covers all modifications which would be apparent to one skilled in the art which would fall within the scope and spirit of the invention.

What is claimed is:

1. In a confection enrobing apparatus having means for spraying enrobing material onto a confection conveyed therethrough, a conveyor comprising:
   (a) a first and a second endless belt each in the form of closed loops having a plurality of thin spikes with outer sharpened ends rigidly affixed thereto to be axially immobile and spaced lengthwise of said belts to project outwardly substantially equidistantly around the periphery of said loops;
   (b) rotatable supporting means contacting said belts to retain each of said belts in the form of a flat loop in which one side of each of said loops is arranged as a straight central segment with substantially straight terminal segments of substantial length at each end thereof inclined to said straight central segment at a small acute angle;
   (c) means for adjustably mounting said supporting means abreast each other to place the two said central segments in an opposite, parallel relation such that the spike ends of opposite belts project inwardly toward each other and are separated by an adjustable distance less than the width of the confection;
   (d) means for moving said belt supporting means to cause each said belt supported thereby to be moved around said loop at the same velocity;
   (e) means for guiding a confection into the space between the spike ends of that first pair of terminal segments which move toward the said central segments to position both sides of the confection in contact with the converging spikes of said first pair of terminal segments, whereby the confection becomes impaled on the moving spikes and is supportingly carried along said central segments toward the other pair of terminal segments; and
   (f) means for guiding the confection impaled on the spikes of the said other pair of terminal segments in the direction of the centerline of said other pair of terminal segments and preventing motion transverse thereto, whereby the diverging spikes of said other pair of terminal segments are withdrawn from the confection and it is released.

2. A method of applying a smooth coating of enrobing material onto all surfaces of a confection comprising the steps of:
   (a) axially inserting into said confection along opposite side edges the end portion of each of a plurality of spikes arranged in opposing rows along both sides of said confection, thereby impaling said confection from both sides;
   (b) spraying a transverse curtain of enrobing material onto a fixed path from at least two opposite directions;
   (c) directing at least two thin, curtain-like blasts of air onto said path transversely thereof from opposite directions;
   (d) moving said opposing rows of spikes at the same velocity along said established path to carry said impaled confection through said sprays to cover all surfaces of the confection with enrobing material and subsequently through said air blasts to wipe excess enrobing material from the surfaces and smooth the layer of enrobing material adhering to all surfaces of the confection; and
   (e) axially withdrawing said spikes from said impaled and coated confection.

3. The method of claim 2 wherein step (c) comprises directing downwardly a first, thin, curtain-like blast of air onto and transversely of said path at an angle from the vertical in the direction of movement of said spikes, directing a second downward transverse air blast similar to said first blast onto said path at an angle from the vertical opposite to that of said first blast, and directing a thin, curtain-like, transverse blast of air upwardly onto said path at an angle from the vertical in the same direction as said second blast.

4. An apparatus for coating confections comprising:
   (a) means for affixing two groups of spikes into two closed loops of outwardly projecting, juxtaposed spikes spaced around the periphery of each said loop and immovable radially thereto;
   (b) means for positioning said loops into a side-by-side, horizontally disposed array to form facing rows of inwardly projecting spikes having a separation therebetween defining a conveying path such that the separation between opposing spike ends in a central portion of said rows is equidistant and less than a confection width and the separation gradually increases in terminal portions of substantial length at both ends of said central portion to form an entrance and an exit segment of said conveying path;

(c) means for moving said spikes circumferentially of each loop at the same velocity, whereby a confection positioned between and contacting the converging moving spikes of said entrance segment is impaled and carried along said conveying path; and (d) means for spraying enrobing material onto said conveying path from at least two opposite directions to cover all external surfaces of an impaled confection carried by said moving spikes.

5. An apparatus for coating confections comprising:
(a) two, side-by-side, horizontally disposed loops of outwardly projecting spikes spaced around the periphery of each loop with adjacent sides of said loops arranged to form facing, adverse rows of inwardly projecting spikes having a separation therebetween defining a conveying path;
(b) the separation between opposing spikes ends in a central portion of said rows being equidistant and less than a confection width and the separation gradually increasing in terminal portions of substantial length at both ends of said central portion to form an entrance and an exit segment of said conveying path;
(c) means for moving said spikes circumferentially of each loop at the same velocity, whereby a confection positioned between and contacting the converging moving spikes of said entrance segment is impaled and carried along said conveying path;
(d) means for spraying enrobing material onto said conveying path from at least two opposite directions to cover all external surfaces of an impaled confection carried by said moving spikes; and
(e) means for directing at least two thin, curtain-like blasts of air transversely onto said conveying path from opposite directions and spaced from said spraying means in the direction of movement of said spikes.

6. An apparatus for coating confections comprising:
(a) a first and a second endless belt in the form of closed loops having thin spikes with outer sharpened ends spaced lengthwise of and affixed to said belts to be immobile axially thereof, said belts to project outwardly substantially equidistantly from the periphery of said loops;
(b) rotatable supporting means contacting said belts to retain each of said belts in the form of a flat loop in which one side of each of said loops is arranged as a straight central segment with substantially terminal segments of substantial length at each end thereof inclined away from said central segment at a small acute angle;
(c) means for adjustable mounting said supporting means abreast each other to place the two said central segments in an opposing, parallel relation such that the spike ends of opposite belts are equidistantly separated by adjustable distance less than the width of the confection;
(d) means for moving said belts circumferentially at the same velocity, whereby a confection positioned and contacting the converging moving spikes of a terminal segment is impaled and carried into the space between said straight central segments, the moving spikes of which form a conveying path;
(e) at least one spray tube on each of opposite sides of said conveying path having spray openings extending transversely across and directed toward said path; and
(f) a pressurized source of enrobing material connected to said spray tube.

7. A method of establishing a substantially even and smooth layer of enrobing material over all external surfaces of a confection freshly covered with said material in liquid form comprising the steps of:
(a) freely supporting said freshly covered confection with a plurality of thin spikes partially inserted into said confection along both sides lengthwise of the confection;
(b) directing at least one thin, curtain-like blast of air onto a fixed path from at least two opposite directions; and
(c) moving said supporting spikes along said fixed path to carry said freshly coated confection through said thin blasts, whereby all exterior surfaces of said freely supporting, freshly coated confection are wiped by said blasts to remove excess liquid enrobing material and even the surface contour of the layer of enrobing material congealing onto said confection.

8. The method of claim 7 wherein step (b) comprises directing downwardly a first, thin, curtain-like blast of air onto and transversely of said fixed path at an angle from the vertical in the direction of movement of said spikes, directing a second, downward, transverse air blast similar to said first blast onto said path at an angle from the vertical opposite to that of said first blast, and directing a thin, curtain-like, transverse blast of air upwardly onto said path at an angle from the vertical in the same direction as said second blast.

9. A method of applying an unbroken coating of thermoplastic enrobing material over all external surfaces of a confection comprising the steps of:
(a) supporting a confection on at least one spike partially inserted into the confection;
(b) from each of at least two oppositely spaced positions spraying said enrobing material in liquid form toward the opposite position to form a converging curtain of spray;
(c) carrying said confection supported on said spike through said converging spray curtain, whereby all external surfaces of the confection are covered with said enrobing material;
(d) withdrawing said spike from the confection after said enrobing material has hardened, thereby leaving a small puncture hole in the hardened layer of material; and
(e) covering said puncture hole by momentarily applying heat to the material around said puncture hole to locally liquify said material and cause it to flow over said hole.

10. A method of producing a coated confection having a layer of edible particles bonded to one surface comprising the steps of:
(a) supporting a confection on at least one spike partialy inserted into the confection;
(b) from each of at least two oppositely spaced positions spraying said enrobing material in liquid form toward the opposite position to form a converging curtain of spray;
(c) carrying said confection supported on said spike through said converging spray curtain, whereby all external surfaces of the confection are covered with said enrobing material; and
(d) transferring said coated confection by means of said spike to beneath a falling colume of edible particles before the coating of enrobing material on said surface has hardened, whereby one surface of said confection becomes coated with said particles.

11. A confection enrobing apparatus comprising:
(a) means for impaling a confection on the end of spikes moving in an established direction along a conveying path to freely support and carry the impaled confection along said path;
(b) spray tube means having at least two spray orifices on one side of said path spaced transversely thereof and directed inwardly toward one another onto said path to form a transversely converging curtain of spray extending across said path;

(c) another spray tube means having at least one orifice on the opposite side of said path from said two spray orifices and directed toward said path to establish a curtain of spray impinging on said path from a direction opposite from that of said two spray orifices; and (d) means for supplying liquid enrobing material to said spray tube means of (b) and (c).

12. A method of applying a coating of enrobing material onto the external surfaces of a confection comprising the steps of:

(a) axially inserting into said confection along opposite side edges the end portion of each of a plurality of spikes arranged in opposing rows lengthwise of said confection, thereby impaling said confection from both sides;

(b) spraying a vertical curtain of enrobing material across a fixed path from at least two opposite directions, at least one of said oppositely directed sprays being formed by directing a central portion of said curtain of spray generally vertically and directing both ends of said curtain inwardly from the vertical;

(c) moving said opposing rows of spikes at the same velocity along said fixed path to carry said impaled confection through said curtain to coat all surfaces of the confection; and (d) axially withdrawing said spikes from said impaled and coated confection.

13. A method of applying a coat of enrobing material onto the exterior surfaces of a confection comprising the steps of:

(a) moving two oppositely arranged and facing rows of spikes in the same direction along gradually converging paths on either side of a confection to insert said spikes into and impale the confection along opposite edges;

(b) after said converging rows of spikes reach a separation less than the width of a confection impaled thereupon, stopping the insertion of said spikes by moving said rows parallel to each other along a fixed path;

(c) spraying a vertical curtain of enrobing material transversly across said fixed path from at least two opposite directions to coat all surfaces of the impaled confection carried therethrough;

(d) after passing through said curtain, moving said rows along gradually diverging paths; and (e) restraining said coated confection impaled on the spikes moving along diverging rows from moving transversely of the direction of said fixed path to withdrawn said spikes from both sides of said coated confection.

14. A conveyer for transporting a penetrable object comprising:

(a) a plurality of spikes having sharpened outer ends;

(b) means for mounting said spikes into a movable train of spaced, juxtaposed spikes of which a portion is arranged along at least one row and each of said spikes is axially immovable relative to said mounting means;

(c) said row including a central portion in which said outer spike ends lie along a straight line and a terminal portion of substantial length at each end of said central portion in which said outer spike ends lie along a line gradually receding in the same direction from an extension of said straight line;

(d) means for moving said train lengthwise along said row, whereby the outer sharpened ends of successive spikes along said row follow paths defined by said lines;

(e) means for bringing one face of a penetrable object into the path of the moving spike ends establishing one of said terminal portions and guiding the one face of the object in the direction of the straight path of the moving spike ends establishing said central portion, whereby the object is impaled and supportingly carried by the moving spikes toward the other of said terminal portions; and (f) means for guiding the impaled object, being carried from said central portion into the other of said terminal portions, in the direction of said straight path and preventing motion transverse thereto, whereby the outer spike ends along the other said terminal portion are withdrawn from the object and the object is released.

15. A conveyor for transporting a penetrable object comprising:

(a) a plurality of spikes having sharpened outer ends;

(b) means for mounting said spikes into two movable trains of spaced, juxtaposed spikes in which portions of said trains are arranged as two spaced apart and opposing rows of spikes with each said spike being axially immovable relative to said mounting means;

(c) said rows having straight central portions in which said outer ends of opposing spikes along said rows are separated equidistantly less than the width of the conveyed object and have terminal portions of substantial length at each end of said central portions inclined from said central portion at a small acute angle in which the separation between said outer ends of opposing spikes gradually increases to more than the width of the object;

(d) means for moving both said trains lengthwise along said rows at the same velocity;

(e) means for supporting an object moved into the space between the outer ends of the spikes along the first pair of terminal portions, which are moving toward said central portions, to position both sides of the object in contact with the converging spikes along said first pair of terminal portions, whereby the object becomes impaled on the moving spikes and is supportingly carried along said central portions toward the other pair of terminal portions; and (f) means for guiding the object impaled on the spikes along said other pair of terminal portions in the direction of the centerline of said other pair of terminal portions and preventing motion transverse thereto, whereby the diverging spikes along said other pair of terminal portions are withdrawn from the object and it is released.

16. A conveyor for transporting a penetrable object comprising:

(a) at least one length of flexible belting having spikes with sharpened outer ends rigidly affixed to said belting to be axially immobile and arranged at spaced intervals along said length to project outwardly from the same side;

(b) means for arranging and supporting said belting to have different portions thereof in an oppositely facing relation such that the spikes in said different portions form two, spaced-apart, adverse rows of spikes projecting toward one another;

(c) said rows having straight central portions in which said outer ends of opposing spikes along said rows are separated equidistantly less than the width of the conveyed object and have terminal portions of substantial length at each end of said central portions inclined from said central portions at a small acute angle in which the separation between said outer ends of opposing spikes gradually increases to more than the width of the object;

(d) means for moving said different portions of said belting at the same velocity, whereby the spikes along said opposing rows move lengthwise along said rows;

(e) means for supporting an object moved into the space between the ends of the spikes along the first pair of terminal portions which are moving toward said central portions to position both sides of the object in contact with the converging spikes along said first pair of terminal portions, whereby the object becomes impaled on the moving spikes and is supportingly carried along said central portions toward the other pair of terminal portions; and (f) means for guiding the object impaled on the spikes along said other pair of terminal portions in the direction of the centerline of said other pair of terminal portions and preventing motion transverse thereto, whereby the diverging spikes along said other pair of terminal portions are withdrawn from the object and it is released.

17. A conveyor for transporting penetrable objects comprising:

(a) two endless belts each having spikes with sharpened outer ends rigidly affixed thereto to be axially immobile and spaced lengthwise of the belt to project outwardly from the periphery of the belt;

(b) means for supporting said belts in the form of two loops in a side-by-side arrangement such that the spikes of adjacent sides of said loops are formed into two, spaced-apart, adverse rows of inwardly projecting spikes;

(c) said rows having straight central portions in which said outer ends of opposing spikes along said rows are separated equidistantly less than the width of the conveyed object and having straight terminal portions of substantial length at each end of said central portions inclined from said central portions portions at a small acute angle in which the separation between said outer ends of opposing spikes gradually increases to more than the width of the object;

(d) means for moving said belts circumferentially at the same velocity, whereby the spikes along said opposing rows are moved lengthwise of said rows at the same velocity;

(e) means for guiding an object into the space between the ends of the spikes along the first pair of terminal portions which are moving toward said central portions to position both sides of the object in contact with the converging spikes along said first pair of terminal portions, whereby the object becomes impaled on the moving spikes and is supportingly carried along said central portions toward the other pair of terminal portions; and (f) means for guiding the object impaled on the spikes along said other pair of terminal portions in the direction of the centerline of said other pair of terminal portions and preventing motion transverse thereto, whereby the diverging spikes of said other pair of terminal portions are withdrawn from the object and it is released.

References Cited by the Examiner

UNITED STATES PATENTS

| | | | |
|---|---|---|---|
| 954,059 | 4/1910 | Sweeney et al. | 239—110 |
| 1,225,013 | 5/1917 | Colt | 118—316 |
| 1,226,824 | 5/1917 | Steely | 107—54.7 |
| 2,606,511 | 8/1952 | Watson et al. | 107—54.7 |
| 2,663,281 | 12/1953 | Wright et al. | 118—13 |
| 2,780,492 | 2/1957 | Stine | 239—110 |

WALTER A. SCHEEL, *Primary Examiner.*

CHARLES A. WILLMUTH, ROBERT E. PULFREY,
*Examiners.*